(12) United States Patent
Sailer

(10) Patent No.: US 7,951,363 B2
(45) Date of Patent: May 31, 2011

(54) ECOLOGICALLY PROTECTED MATERIAL

(75) Inventor: Michael Fritz Sailer, Delft (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 1127 days.

(21) Appl. No.: 10/581,157

(22) PCT Filed: Dec. 1, 2004

(86) PCT No.: PCT/NL2004/000831
§ 371 (c)(1),
(2), (4) Date: May 31, 2006

(87) PCT Pub. No.: WO2005/053923
PCT Pub. Date: Jun. 16, 2005

(65) Prior Publication Data
US 2008/0286240 A1 Nov. 20, 2008

(30) Foreign Application Priority Data
Dec. 1, 2003 (EP) .................................. 03078774

(51) Int. Cl.
*A01N 63/04* (2006.01)
*B27K 3/34* (2006.01)
*B05D 3/00* (2006.01)
*C04B 16/00* (2006.01)

(52) U.S. Cl. .................... 424/93.5; 106/241.1; 106/218; 106/228; 106/493; 435/252.1; 427/372.2; 424/93.1; 424/93.51

(58) Field of Classification Search ............. 106/8, 218, 106/228, 241.1, 493; 427/372.2; 435/252.1; 424/93.5, 93.1
See application file for complete search history.

(56) References Cited

U.S. PATENT DOCUMENTS

| 3,674,524 | A | * | 7/1972 | Littlepage | 106/243 |
| 5,356,624 | A | | 10/1994 | Croan et al. | |
| 5,534,252 | A | | 7/1996 | McAfee et al. | |
| 5,538,752 | A | * | 7/1996 | Blanchette et al. | 427/4 |
| 5,919,689 | A | * | 7/1999 | Selvig et al. | 435/202 |
| 2004/0109853 | A1 | * | 6/2004 | McDaniel | 424/94.6 |

FOREIGN PATENT DOCUMENTS

| DE | 195 36 328 | 4/1997 |
| DE | 198 41 271 | 3/2000 |
| WO | WO-93/01923 | 2/1993 |
| WO | WO-00/75293 | 12/2000 |

OTHER PUBLICATIONS

Haefner et al. English Machine Translation of DE19536328 from EPO website downloaded on Aug. 2, 2010. p. 1-3.*
Landerer. English Machine Translation of DE19841271 from EPO website downloaded on Jul. 31, 2010. p. 1.*
Greaves, Material Und Organismen (1970) 5(4):265-279.
International Search Report for PCT/NL2004/000831, mailed on Mar. 1, 2005, 3 pages.
Kreber et al., Wood and Fiber Science (1993) 25:23-34.

* cited by examiner

*Primary Examiner* — Taeyoon Kim
(74) *Attorney, Agent, or Firm* — Morrison & Foerster LLP

(57) ABSTRACT

The present invention relates to an ecological protected material, comprising a base material (4) provided with a water-insoluble substance, a growth substrate and a microorganism layer. The invention further relates to a method for preparing a material according to the invention, comprising providing a base material with a water-insoluble substance, a growth substrate and a microorganism.

16 Claims, 2 Drawing Sheets ary application EP03078774.1, filed on 1 Dec. 2003.
ECOLOGICALLY PROTECTED MATERIAL

CROSS-REFERENCE TO RELATED APPLICATION

This application is a U.S. National Phase of PCT/NL2004/000831, filed on 1 Dec. 2004, which claims priority to European patent application EP03078774.1, filed on 1 Dec. 2003. The contents of said applications are incorporated herein in their entirety.

The invention relates to a material, in particular a natural material provided with a micro-organism. The invention further relates to a method of treating material and to the use of such a material.

The protection of materials, in particular biodegradable materials such as wood, is in practice usually accomplished by treating the material with biocidal chemical, in particular fungicidal chemicals. The durability of wood is for instance improved by applying metal salts such a salts of copper, chromium and/or arsenic or by organic biocidal compounds.

From an environmental and health viewpoint, the use of such biocidal compounds is undesired. Accordingly, environmental and health regulations put more and more strict limits on the use of such compounds.

U.S. Pat. No. 5,356,624 describes a method for retarding the growth of wood-degrading fungi by treating the wood with an effective amount of a viable, nonsporulating, *Streptomyces rimosus* strain. Grown cells, which produce a metabolite, which stops fungal attack, are used to treat the wood by incubation.

U.S. Pat. No. 5,534,252 relates to a method for controlling sapstain in wood, wherein otherwise untreated wood is steam pasteurised and then dipped in a spore solution containing spores of a fungus from the class Hyphomycetes.

DE-A 195 36 328 describes a composition for protection wood against hazardous organisms, such as *Aureobasidium* spp. The composition may comprise a bacterium, such as *Bacillus subtilis*. A material that is first treated with a water-insoluble compound, upon which a separate, covering micro-organism layer is applied, is not disclosed.

There remains a continuing need for environmentally friendly materials with a satisfactory resistance against deterioration due to influence of micro-organisms and/or weather-effects, such as UV-radiation and moisture. It has been found that a satisfactory resistance against deterioration due to degrading micro-organisms and/or weather effects such as UV-radiation and moisture is achieved by providing a material with a combination of specific substances and protecting micro-organisms.

Accordingly, the present invention relates to a method for preparing a material, comprising a base material (4) provided with a water-insoluble substance, a growth substrate and a covering micro-organism layer (1), said method comprising
  applying a water-insoluble substance to the base material, and
  applying a micro-organism layer to the base material comprising the water-insoluble material.

Preferably the method also comprises applying a growth substrate for growing a micro-organism to the base material. The growth substrate is considered to be beneficial to the formation of the micro-organism layer, e.g. it may accelerate the formation of a covering layer of the micro-organism. The growth substrate may be provided together with another layer (the micro-organism layer and/or a layer of the water-insoluble substance) and/or applied as a separate layer, preferably adjacent to the micro-organism.

In addition, the present invention relates to a material, comprising a base material provided with a substance which is insoluble in water a protecting micro-organism layer and optionally a growth substrate.

In general, the water-soluble substance and the micro-organism layer are applied such that the micro-organism layer is essentially separated from the base material by the water-insoluble substance. The growth substrate may be present in another layer (the micro-organism layer and/or a layer of the water-insoluble substance) and/or applied as a separate layer, preferably adjacent to the micro-organism, in particular between the base material treated with the water-insoluble substance and the micro-organism layer.

It has been found that a material according to the invention has a very good dimensional stability with a low tendency to formation of cracks.

A material according to the invention has been found to have a very good resistance against degrading micro-organisms, such as a rot.

A material according to the invention further has been found to have a durable homogenous surface colour.

A material according to the invention has been found to be very suitable for use as a construction or building material. A material according to the invention has been found very suitable in outdoor applications, such as in garden utilities. In particular, it has been found very suitable as a material, in an application without substantial soil contact. Examples of such applications are garden furniture, fences, façade elements and cladding.

BRIEF DESCRIPTION OF THE DRAWINGS

FIG. 1 shows a possible embodiment of the invention. Herein the base material 4 is subdivided in a non-impregnated core zone 4b and an outer zone 4a, impregnated with water insoluble substance. The hatched area 5 in zone 4a represents the impregnated material present in parts of the material that are penetrated by hyphae of the micro-organisms. Area 5 may be non-impregnated or impregnated to a lesser extent than the surrounding area 5. Of course the impregnation may also be homogenous throughout the zone 4. In this embodiment a water insoluble coating 3 is present at the surface of the base material 4a. On top of the coating 3 a growth substrate layer 2 is present. The micro-organism layer 1 forms the outer surface of the material.

Figure 1:
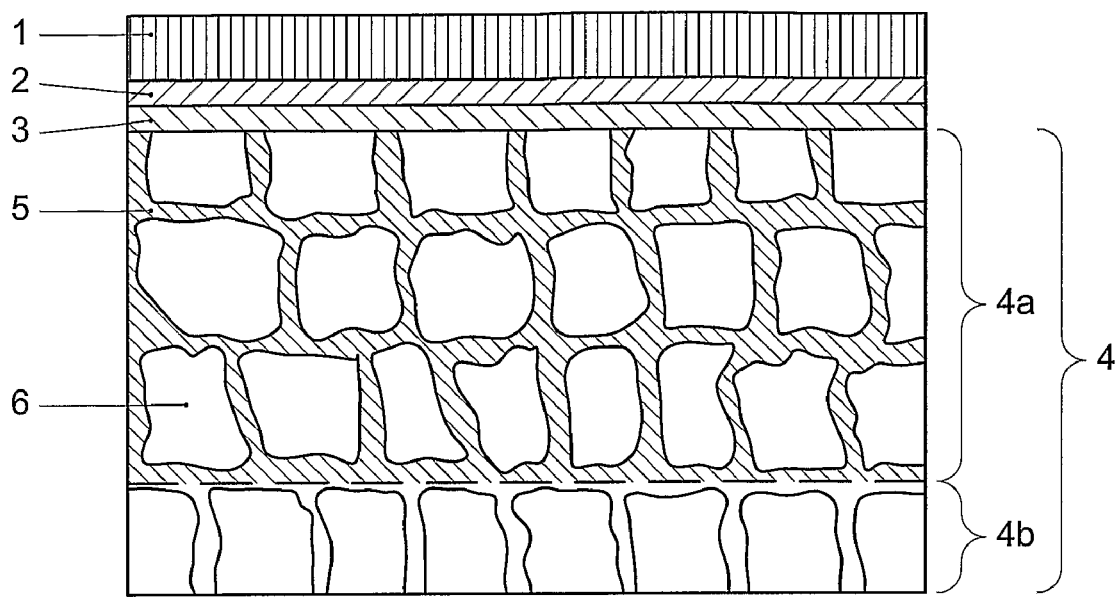
FIG. 1 shows an embodiment of the invention which comprises a base material subdivided in a non-impregnated core zone and an outer zone impregnated with water soluble substance.

As a base material, any material may be used, in particular any material that is susceptible to deterioration by micro-organisms. Preferred base materials are wood, concrete, stone and ceramics. Very good results have been achieved with a natural material, in particular with wood, more in particular with softwood (such as pine, or the like). However the method according to the invention be applied to any wood species.

The term "water-insoluble substance" is in general used herein to describe a substance that prevents or at least slows down the penetration of liquid water into the base material.

Very good results have been achieved with a water-insoluble substance comprising at least one organic compound. Such an organic compound is preferably selected from the group consisting of mineral oils, waxes, vegetable- and animal oils, including mixtures and water-insoluble derivatives of any of these compounds. It is contemplated that the water-insoluble substance may provide one or more functions. It is thought to serve as a protective barrier against water. Further, the water-insoluble substance is thought to facilitate the formation of a uniform (covering) micro-organism layer on top of the water-insoluble substance. It is noted that the use of water insoluble substances to protect wood is known, e.g. from DE-A 198 41 271. However, use of such substance in combination with micro-organism layers is not suggested, in particular not to provide a specific protective function and/or a decorative effect.

In particular a C4 to C32 saturated or unsaturated fatty acid ester of a fatty acid with a polyol, such as glycerol, has been found very suitable.

Good results have inter alia been achieved with an oil extracted from a seed or fruit. Examples of such oils are film forming vegetable oils. Very good results have been achieved with linseed oil and with hempseed oil.

Optionally, the water-insoluble substance is present in a mixture with one or more other additives, such as one or more additives selected from the group consisting of amino acids and pentosans. These additives can be used as nutrients by the micro-organisms. Additives from the group of metal-salts may be used in order to improve polymerisation of the substrate, which may have a positive effect on the durability of the wood.

A preferred material according to the invention comprises a water-insoluble coating 3 on top of the surface of the base material 4. The presence of such a coating has been found to have very good blocking properties against penetration of (liquid) water. Further, it is thought that such a coating contributes to levelling the surface of the base material, which may contribute to a favourable uniform micro-organism layer. In addition, the presence of a water-insoluble coating has been found to cooperate with the protective micro-organism layer to shield the base material against degrading micro-organisms.

Advantageously, water insoluble coating has a thickness in the range of about 1-1000 μm. Such a layer thickness has been found to contribute to a desired evenness of the protective micro-organism layer Very good results have been achieved with a thickness of at least 5 μm.

The material may be partially or fully impregnated or coated with the water-insoluble substance.

The growth substrate may be present in the micro-organism layer, in a mixture with the water-insoluble substance and/or as an intermediate growth substrate layer between the micro-organism layer and the base material.

Organic substances produced from vegetable or animal resources can be used as nutrients for the growth of the micro-organisms. As a growth medium, preferably a substrate based on digestible carbohydrates is used.

The micro-organism or organisms are preferably chosen in order to fulfil the requirements related to the use such as UV-resistance, tolerance to climatic and weather changes (temperature and moisture availability). Further, from a enhanced durability point of view, the micro-organisms should not substantially degrade the base material but form a protecting layer. It is preferred that the functional properties and appearance of the system can be controlled by the use of adequate organisms, additives, composition of various parts of the system or variations in the production process.

Preferred are micro-organisms which grow on surfaces of materials under extreme climate conditions but are not (severely) damaged by extreme climate conditions. Suitable are for instance micro-organisms from the group of fungi, including yeasts, and bacteria. Preferred micro-organisms include microorganisms from the group of black yeasts and related fungi.

For instance, use may be made of a micro-organism comprising a pigmentation system (hereafter referred to as pigmented micro-organism), such as *Aureobasidium* spp., which has been found suitable to influence a surface appearance like gloss, colour or opacity.

The range of the colours may be found in the whole visible spectrum, the gloss may be in the range of 0-80% (intensity, reflection of scattered light according to ISO 2814).

The micro-organism layer preferably fully covers the base material.

The micro-organism layer preferably is the outermost layer of the material and/or has grown through the substrate.

The micro-organism layer may be a single layer of micro-organism cells. The thickness of the micro-organism layer is preferably less than 1 000 μm, more in particular between about 1 and about 100 μm. More preferably the thickness of the micro-organism layer is at least 5 μm.

The micro-organism layer preferably essentially consists of microorganisms and growth substrate or micro-organisms and at least one nutrient which can be originating from the growth substrate or precipitated from the surrounding environment.

The micro-organism layer may contribute to the visual appreciation of the product, in particular when a pigmented micro-organism (coloured micro-organism) is present such as *Aureobasidium* spp. Such a micro-organism may provide a uniform and reproducible colour varying from light colours (red, green) to almost black) throughout the surface of the material.

Besides using the micro-organism in order to give the material a homogeneous appearance, it has been found that a pigmented micro-organism contributes to the resistance of the base material against deterioration due to UV-radiation.

Besides having good protective properties, it has been found that such a layer contributes to a durable optical quality of the surface. Indicative rubbing tests showed that that the mechanical resistance is satisfactory.

As indicated above, in accordance with the invention a material, such as a construction material may be prepared by providing a base material with a hydrophobic substance (or water-insoluble substance), a growth substrate and a micro-organism layer.

More in particular, a method according to the invention comprises applying a water insoluble substance to the base material;

applying a growth substrate to the base material together with the water insoluble substance and/or after applying the water insoluble substance; and covering the base material comprising the water insoluble substance with a micro-organism layer, which layer optionally comprises growth substrate.

Preferably, the base material is initially subjected to application of the water-insoluble substance (such as a vegetable oil). This treatment is believed to contribute to the protection of the material against degrading micro-organisms. Further, it is contemplated that the water-insoluble substance may function as a ground layer upon which a micro-organism layer can be applied with a desirably uniform layer thickness and/or a highly uniform colour.

Depending upon the type of material, the application conditions, such as temperature, pressure, duration, composition of the material to be applied and atmosphere may suitably be chosen based upon common general knowledge and the information disclosed in the present claims and description, including the cited references.

The water-insoluble substance, such as the oil, may be applied as such (optionally mixed with additives) or mixed (preferably dissolved) in a solvent for the water insoluble substances.

Solvents may in particular be used when the water-insoluble substance is to be applied, in particular impregnated, at a relatively low temperature, such as at a temperature of about 30° C. or less, in particular at or near ambient temperature (typically around 15-25° C.). A method not making use of a solvent is preferably carried out at elevated temperature, in particular above 30° C., preferably above about 60° C.

Suitable solvents include ethers (such as petrolether) and ketones (such as acetone), including mixtures thereof. The amount of solvent may be chosen within a wide range, in particular within a ratio of solvent to water-insoluble substance (wt. to wt.) in the range of between 0 and 100, more in particular in the range of 1-95, even more in particular in the range of 10-90.

By choosing the solvent and selecting the ratio, the retention of the water-insoluble substance to the base material can be controlled. In general, retention is increased with decreasing solvent to water-insoluble substance ratio. A high retention is desirable in view of very high durability of the material and/or to facilitate the application of a highly uniform micro-organism layer, which in case of a coloured micro-organism also contributes to a highly uniform colour of the micro-organism layer. An advantage of a relatively low retention is the reduced consumption of water-insoluble oil.

For a relatively high retention it is preferred that the ratio is less than about 1, more preferably about 0.5 or less, in particular between 0 and 0.4.

Further, it is contemplated that the presence of the solvent, when more volatile than the water insoluble substance, contributes to a faster drying of the material after applying the water-insoluble substance, and/or the use of a solvent may facilitate handling of the water-insoluble substance, in particular at a low temperature at which the substance may be very viscous or even solid.

In general, during the application of the water-insoluble substance (such as vegetable oil) the temperature of the medium surrounding the material may be kept in the range between 20° C. and 240° C. for a period of time. The upper limit of the temperature is in practice determined by the material properties.

In general, a treatment at a temperature in the range of 60-160° C., in particular in the range of 60-140° C., more in particular in the range of 70-120° C. has been found to be effective, especially when treating wood with an oil (in particular without using additional solvent).

The duration of the application of the water-insoluble substance inter alia depends on the geometry of the material, and the desired substrate uptake. In general, it is preferred that the application is carried out for a duration that is sufficient to heat up the material or part of the material to a temperature of about 60° C. or more. Good results have inter alia been achieved with a treatment with the water-insoluble substance in the heated medium of at least about 2 minutes, preferably of at least about 1 hour. A treatment of up to about 2 hours is in general satisfactory.

After applying the water-insoluble substance, the material may be taken out of the medium and be acclimatized at ambient temperature (usually 15-30° C.).

In an embodiment, the base material provided with the water-insoluble substance is subjected to drying at elevated temperature, in particular at a temperature of at least about 50° C., more in particular in the range of about 100-140° C., after applying the water-insoluble substance (with or without solvent). Such drying at elevated temperature is considered to be advantageous with respect to the forming of a film comprising water-insoluble substance.

The micro-organism may be applied using any suitable suspension. Highly suitable suspensions comprise growth substrate (oils) and/or other nutritious substances like sugars. Further the suspension typically comprise the micro-organism, spores thereof and/or mycelium of the micro-organisms. Possible application techniques are spray techniques (e.g. as described in IRG/WP 97 20113, brushing and immersion of the material in the suspension containing the micro-organisms, spores and/or mycelium.

The invention is further illustrated by the following example.

EXAMPLES

Treatment I

Treatment I involved an impregnation of the wood in a standard impregnation kettle. The wood was placed in the kettle in a bath of 75% linseed oil in a solvent (acetone). While the wood was in the bath first a vacuum ($8 \times 10^3$ Pa) was applied for 0.2 hr. Next, the impregnation was pressurised for 1.5 hr. at $8 \times 10^5$ Pa to allow impregnation of the oil into the wood. Thereafter the wood was taken out of the kettle and placed in an oven, heated at 103° C. for 96 hr. The temperature in the core of the wood reached 100° C.

The following retentions were achieved

TABLE 1 retention of oil on wood

| Treatment of the wood: | | Retention kg/m3 |
|---|---|---|
| Oil I | (75% acetone) | 170 |
| Oil I | (25% acetone) | 330 |
| Oil II | (75% acetone) | 160 |
| Oil II | (25% acetone) | 420 |

Oil I: linseed-oil,
oil II: hempseed-oil

TABLE 2

Effect of treatment, after 3 years exposure to environment

| Material | Mass change after 3 years exposition | Remarks |
|---|---|---|
| Untreated pine sapwood (Control) | −5% | Degradation confirmed by microscopic assessment |
| pine sapwood, provided with oil I (invention) | 0.0% | No degradation noticed |
| pine sap wood, provided with oil II (invention) | 0.0% | No degradation noticed |
| Reference Example (pine sapwood with Cu-HDO (Copper-cyclohexyldioxydieazeniumoxide) | −1.2% | No degradation, mass change probably caused by leaching |

Figure 2:
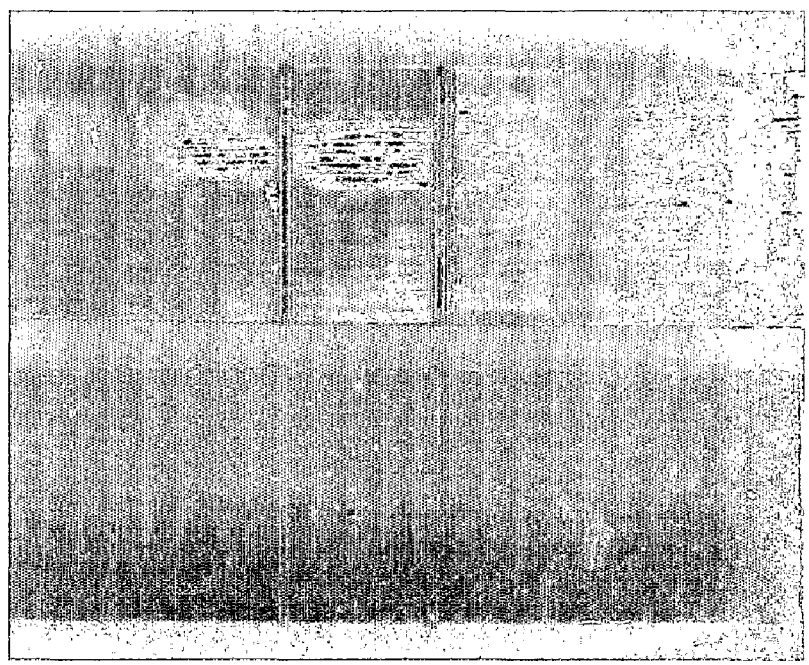
FIG. 2 shows the distribution of the microorganism layer in an invention embodiment and a control.

The impregnated and heated samples were inoculated with the microorganisms in growth substrate and after some weeks the surfaces were covered as demonstrated in FIG. 2.

FIG. 2 (bottom) shows that a uniformly coloured microorganism layer is formed in accordance with the invention. The top row shows a reference material wherein the microorganism layer is not uniform. The material is only partly covered by a substrate film, which leads to an undesired spot forming.

Treatment 2

Untreated wood was immersed in a heated oil-bath at higher temperatures namely at a temperature of 140° C. over a period of 2 hours Following the application of the oil the bath with the wood remains in the bath until a temperature below 60° C. (in the bath) was reached. The material was then taken out of the bath and acclimatized at room temperature. Drying Material impregnated according to treatment 1 and material impregnated according to treatment 2 (acclimatised to room temperature) were placed in an oven at drying temperature of 105° C. f for a duration of 72 hours, before applying a microorganism layer.

Both the wood of treatment 1 and the wood of treatment 2 comprised a thin oil film of uniform thickness on the surface of the wood after the treatment in the oven.

The invention claimed is:

1. A composition of matter which comprises a base material provided with a coating of a water-insoluble substance at the surface, and a micro-organism layer applied to said coating
   wherein the base material is wood, concrete, ceramic or stone,
   wherein the microorganism layer comprises *Aureobasidium* spp having a pigmentation system; and
   wherein said microorganisms fully cover the base material so as to provide the surface of the base material with a uniform color.

2. The composition of claim 1, wherein the water-insoluble substance at least partially impregnates the base material.

3. The composition of claim 1, wherein at least part of the water-insoluble substance is applied in a layer on top of the surface of the base material.

4. The composition of claim 3, wherein the water insoluble layer has a thickness in the range of 1-1000 μm.

5. The composition of claim 1, wherein the water-insoluble substance comprises at least one component selected from mineral oils and waxes, vegetable oils and waxes and animal oils and waxes.

6. The composition of claim 1, wherein the water-insoluble substance comprises at least one C4 to C32 saturated or unsaturated fatty acid-ester.

7. The composition of claim 1, wherein a growth substrate is present in the micro-organism layer, and/or in a growth substrate layer between the micro-organism layer and the base material.

8. The composition of claim 7, wherein the growth substrate comprises carbohydrates and/or proteins.

9. The composition of claim 1, wherein the thickness of the micro-organism layer is less than about 1000 μm.

10. A method to prepare the composition of claim 1, said method comprising
    a) applying the water-insoluble substance to the base material,
    b) optionally applying a growth substrate for growing a micro-organism to the base material; followed by
    c) applying the micro-organism layer to the base material.

11. The method of claim 10, wherein step a) is conducted in the presence of a heated medium at a temperature in the range of 30 to 240° C.

12. The method of claim 10, which further includes the step of drying at a temperature in the range of about 100-140° C., after step a).

13. The method of claim 10, wherein in step a) at least part of the water-insoluble substance is applied by impregnation into the base material.

14. The method of claim 10, wherein in step a) the water-insoluble substance is applied as a mixture comprising the water-insoluble substance and a solvent for the water-insoluble substance.

15. The method of claim 14, wherein the solvent is selected from the group consisting of alcohols, ethers and ketones.

16. The method of claim 10, wherein the growth substrate is applied in a layer together with the micro-organism and/or as a separate layer between the base material and the micro-organism before step c).

* * * * *